May 16, 1961 J. R. BRADSHAW ET AL 2,984,731
ELECTRIC ARC CUTTING ELECTRODES
Filed May 6, 1958 2 Sheets-Sheet 1
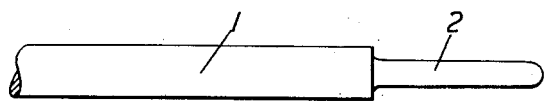
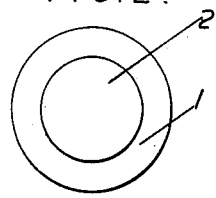 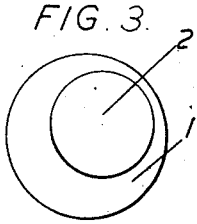
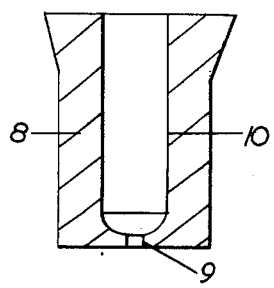
Inventor
JAMES RONALD BRADSHAW
ROBERT ARTHUR CRESSWELL
By
Aaron R. Townshend Attorney May 16, 1961    J. R. BRADSHAW ET AL    2,984,731
ELECTRIC ARC CUTTING ELECTRODES
Filed May 6, 1958    2 Sheets-Sheet 2
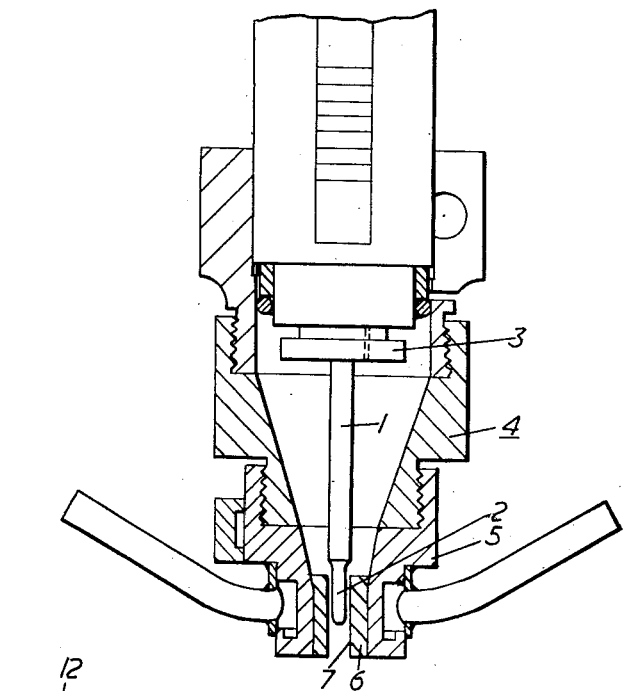
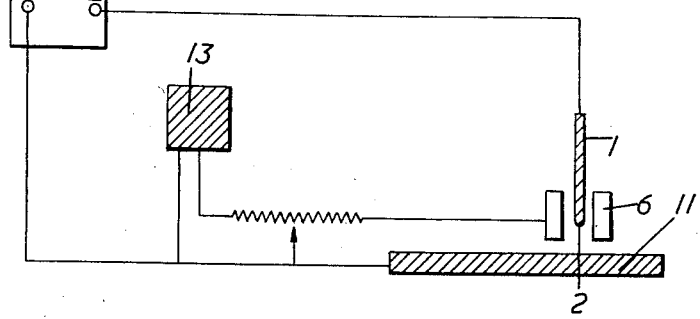
Inventor
JAMES RONALD BRADSHAW
ROBERT ARTHUR CRESSWELL
By
Aaron R. Townshend Attorney United States Patent Office 2,984,731
Patented May 16, 1961

2,984,731
ELECTRIC ARC CUTTING ELECTRODES

James Ronald Bradshaw, Sussex, and Robert Arthur Cresswell, Surrey, England, assignors to The British Oxygen Company Limited, a British company Filed May 6, 1958, Ser. No. 733,434
Claims priority, application Great Britain May 6, 1957
1 Claim. (Cl. 219—69)

This invention relates to electrodes of the so-called non-consumable type such as may be used for the electric arc cutting of metal workpieces, and to methods of gas shielded electric arc cutting using such electrodes.

Non-consumable electrodes of this type are commonly made of refractory material such as tungsten, and although some consumption of such an electrode may occur in use the rate of consumption is so low that only occasional adjustment of the electrode setting in its holder is required. In contrast to this, consumable electrodes are fed continuously to the cutting arc.

In gas shielded electric arc cutting processes using a non-consumable electrode it is desirable to obtain a high voltage across the electric arc and it is an object of the present invention to provide a non-consumable electrode which enables this to be done by requiring a lower voltage drop across the electrode than is necessary with a conventional electrode providing a similar small diameter arcing tip. A small diameter arcing tip is generally necessary for good arc stability in such cutting processes and also to conform to the optimum relationship between electrode and nozzle when cutting common metals of thicknesses in the range of up to a few inches. An electrode tip having a diameter of the order of one eighth of an inch or less will in general be suitable. Conventional electrodes having this diameter throughout their length may not be accurately straight when supplied or may acquire a bend in use, and it is a further object of the present invention to provide electrodes of greater rigidity having a similar small diameter tip which allows for some consumption of the electrode without appreciable variation of the diameter of the arcing tip itself.

According to one aspect of the present invention, a non-consumable electrode comprises a rod or the like which is stepped to form an electrode tip of smaller cross-sectional area than that of the main part of the electrode.

The cross-section of the electrode tip should be sufficiently large that this tip does not overheat during normal use, but not so large as to allow the location of the arc root to vary to an undesirable extent. The cross-sectional diameter of the electrode tip may, for example, be of the order of two thirds of the cross-sectional diameter of the main part of the electrode.

In one gas shielded electric arc cutting process using a non-consumable electrode, the electrode is mounted in line with an orifice in a cutting head supporting the electrode, the electric arc being established between the electrode and a workpiece to be cut by way of the orifice. It is desirable that the electrode tip be accurately centred with respect to this orifice.

According to a feature of the present invention, the electrode tip is eccentric to the main part of the electrode. Centering of the electrode tip may therefore be effected by suitably rotating the main part of the electrode in its collet or other supporting member.

According to another aspect of the present invention, a method of gas shielded electric arc cutting comprises establishing an arc between a stepped non-consumable electrode and a workpiece to be cut and through a narrow orifice between the electrode and the workpiece, and directing a stream of shielding gas through the orifice towards the workpiece.

Examples of non-consumable electrode and processes of electric arc cutting in which such electrodes are used will now be described by way of example with reference to the six figures of the acompanying drawings in which:

Figures 1 and 2 show side and end views respectively of a first construction of electrode;

Figure 3 shows an end view of a second construction of electrode;

Figure 4 shows a sectional elevation of an electric arc cutting head incorporating an electrode as shown in Figures 1 and 2;

Figure 5 is a schematic diagram of an electrical circuit which may be used with the cutting head of Figure 4; and Figure 6 is a sectional elevation of an alternative nozzle insert for use in the cutting head shown in Figure 4.

Referring to Figures 1, 2 and 3 of the drawings, the electrodes in accordance with the present invention comprise a single rod of suitable refractory material such as tungsten, or preferably tungsten alloyed with 1% or 2% of thorium, which is of cylindrical stepped form. The main part of shank 1 of the electrode is of 3/16 inch diameter and the electrode tip 2 is of reduced cross-section 1/8 inch diameter, and about 1/2 inch in length. The electrode tip 2 may be formed by machining a rod of uniform circular cross-section. In Figures 1 and 2 the electrode tip 2 is coaxial with the shank 1. In Figure 3 the tip 2 is eccentric to the shank to facilitate centering of the electrode tip 2 with respect to the orifice in the cuting head in which the electrode is used. The arcing end of the electrode tip 2 is preferably rounded as shown but it may be left square and allowed to assume a rounded shape in use.

For use, as shown in Figure 4, the electrode is mounted by means of a collet 3 or other support member in a tubular housing 4 forming part of a cutting head. The tubular housing 4 may be terminated by a water-cooled nozzle 5 which carries a nozzle insert 6 of electrographite for example. An orifice 7 is formed in the nozzle insert 6, and the electrode is mounted in line with the orifice with the electrode tip 2 extending therein and spaced from the insert. For use in conjunction with the above electrode the nozzle insert 6 may be formed with an orifice 7 having a uniform diameter of 3/16 inch, and a depth of 1/2 inch. In an alternative construction of nozzle insert shown in Figure 6, the insert 8 is internally stepped to provide an orifice of cylindrical form in which the outermost part 9 is of smaller cross-sectional area than the innermost part 10 which surrounds and is spaced from the electrode tip. With both constructions of nozzle insert, the arcing end of the electrode tip 2 is set back approximately 3/16 inch from the outer face of the nozzle insert 6 or 8 seen in Figures 4 and 6 respectively.

In operation according to the invention, a main arc is established between the electrode tip 2 and a metal workpiece 11 (see Figure 5) to be cut, the main arc being initiated by a high frequency spark or pilot arc, and a high velocity stream of gas is passed through the orifice from the interior of the housing to produce a constricted pencil-like main arc. The high frequency spark or pilot arc may be struck between the nozzle insert 6 or 8 and the electrode tip 2. The cutting head is moved relatively to the workpiece along the line of cut to maintain the main arc and cut through the workpiece 11.

The cutting head may be connected in a circuit such as that shown in Figure 5, the electrode shank 1 being connected to the negative pole of a source 12 of direct current and the workpiece being connected to the positive pole of this source. A high frequency source 13 is also connected between the workpiece 11 and the insert 6 or 8 to provide a pilot arc therebetween.

We claim:

In gas shielded electric arc cutting apparatus comprising a tubular housing, a nozzle mounted in one end of said housing, said nozzle defining an orifice, and an electrode mounted axially within said housing and in line with said orifice, the improved electrode which comprises a non-consumable solid rod which is stepped so as to have a main portion and a tip portion that is eccentric to the main portion, said tip portion having a cross-sectional area smaller than that of the main portion of the electrode, whereby adjustment of the tip portion of the electrode to an approximately centrally disposed position with respect to the orifice may be effected by rotation of the main portion of the electrode relative to the tubular housing.

References Cited in the file of this patent

UNITED STATES PATENTS

| | | |
|---|---|---|
| 1,512,786 | Morton | Oct. 21, 1924 |
| 1,898,060 | Noble | Feb. 21, 1933 |
| 2,274,631 | Meredith | Feb. 24, 1942 |
| 2,298,633 | Winlock et al. | Oct. 13, 1942 |
| 2,387,903 | Hensel | Oct. 30, 1945 |
| 2,389,945 | Wisler | Nov. 27, 1945 |
| 2,806,124 | Gage | Sept. 10, 1957 |
| 2,813,966 | Matulaitis | Nov. 19, 1957 |